No. 727,746. PATENTED MAY 12, 1903.
J. F. BYERS.
TIRE FASTENING.
APPLICATION FILED JAN. 6, 1903.
NO MODEL.

Witnesses.
J. N. Barber.
E. H. Rickerson

Inventor.
John F. Byers.
By E. N. Barber,
Atty.

No. 727,746. Patented May 12, 1903.

UNITED STATES PATENT OFFICE.

JOHN F. BYERS, OF RAVENNA, OHIO.

TIRE-FASTENING.

SPECIFICATION forming part of Letters Patent No. 727,746, dated May 12, 1903.

Application filed January 6, 1903. Serial No. 138,048. (No model.)

*To all whom it may concern:*

Be it known that I, JOHN F. BYERS, a citizen of the United States of America, and a resident of Ravenna, in the county of Portage and State of Ohio, have invented certain new and useful Improvements in Tire-Fastenings, of which the following is a specification.

My invention relates to improvements in elastic or flexible tires and means for securing the same to wheels; and the object of my invention is to provide a tire of the type named composed of detachable segmental sections and suitable means for securing the same to the felly of a wheel. I attain this object by the mechanism and construction illustrated in the accompanying drawings, in which—

Figure 1:
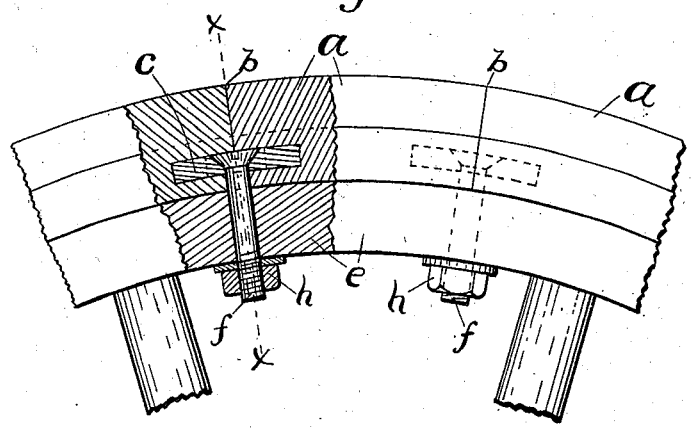
Figure 2:
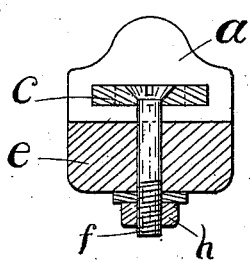
Figure 3:
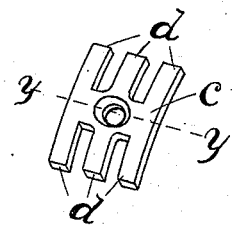

Figure 1 is a partial side elevation of a wheel rim and tire secured together by my fastening, a part of the view being in central vertical section; Fig. 2, a transverse section on line $xx$ of Fig. 1; Fig. 3, a perspective view of the anchor-plate; and Fig. 4 a transverse section similar to Fig. 2, but showing the screw-bolt applied in a different way.

Like reference-letters indicate like parts throughout the several views.

As shown in Figs. 1 and 2, the tire $a$ is in short segmental sections, the joints between the abutting ends of which are at $b\ b$. At each joint $b$ a stiff metallic anchor-plate $c$ is so embedded in the tire as to leave a portion of the same between said plate and the felly $e$. The anchor-plates are formed with two or more prongs $d$ at each end, and cavities of corresponding shape are formed in the ends of the tire-sections to receive one-half of a plate with the dividing-line, as shown by line $yy$ in Fig. 3, thus leaving portions of the tire each side of and also between the prongs for securing the portion above to that below the anchor-plate. The plates are pronged for the purpose of leaving the parts of tire between the prongs to tie the part above to the part below the plates.

Figure 4:
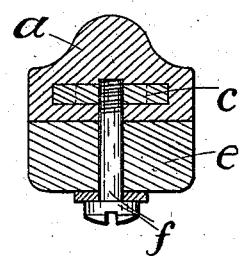

Each anchor-plate is secured to the felly $e$ by one or more headed and screw-threaded bolts $f$ and nuts $h$, as shown in Figs. 1 and 2, in which only one bolt is shown for each plate, or the screw-bolts $f$ may be applied, as shown in Fig. 4, by threading them into the anchor-plates. By means of these screw-bolts and inserted plates the portions of the tire between the plates and the felly may be tightly pressed against and held to the felly, and damaged sections of tire may easily be removed and new ones substituted therefor.

What I claim as my invention, and desire to secure by Letters Patent, is—

A tire composed of a series of flexible segmental sections joined end to end, each having two or more socket-like cavities in each end surface, in combination with an equal number of metal plates each having four or more prongs, inserted in the said cavities of two adjacent tire-sections and secured to the felly of a wheel by screw-bolts, all substantially as set forth.

Signed at Ravenna, Ohio, this 2d day of January, 1903.

JOHN F. BYERS.

Witnesses:
ALICE G. STROW,
A. S. COLE.